(12) United States Patent
Widmaier et al.

(10) Patent No.: US 9,007,870 B2
(45) Date of Patent: Apr. 14, 2015

(54) SEISMIC SURVEYING TECHNIQUES WITH ILLUMINATION AREAS IDENTIFIABLE FROM PRIMARY AND HIGHER-ORDER REFLECTIONS

(75) Inventors: Martin Widmaier, Oslo (NO); Walter Sollner, Oslo (NO); Stian Hegna, Hovik (NO); Steve Bishop, Farnham (GB)

(73) Assignee: PGS Geophysical AS, Oslo (NO)

( * ) Notice: Subject to any disclaimer, the term of this patent is extended or adjusted under 35 U.S.C. 154(b) by 539 days.

(21) Appl. No.: 13/485,552

(22) Filed: May 31, 2012

(65) Prior Publication Data

US 2013/0322205 A1 Dec. 5, 2013

(51) Int. Cl.
*G01V 1/38* (2006.01)

(52) U.S. Cl.
CPC .................... *G01V 1/3808* (2013.01)

(58) Field of Classification Search
CPC ..... G01V 1/282; G01V 1/3803; G01V 1/362; G01V 2/167; G01V 2210/16; G01V 2210/50
USPC ........................................................ 367/15
See application file for complete search history.

(56) References Cited

U.S. PATENT DOCUMENTS

| | | | |
|---|---|---|---|
| 4,937,793 A * | 6/1990 | Shuck et al. ............. | 367/24 |
| 6,590,831 B1 | 7/2003 | Bennett et al. | |
| 7,359,283 B2 | 4/2008 | Vaage et al. | |
| 7,505,361 B2 | 3/2009 | Sollner | |
| 7,520,467 B2 * | 4/2009 | Gioffre et al. ............. | 244/118.1 |
| 7,554,880 B2 | 6/2009 | Fleming | |
| 7,835,225 B2 | 11/2010 | Sollner et al. | |
| 2006/0291328 A1 * | 12/2006 | Robertsson et al. ............ | 367/24 |
| 2007/0064526 A1 | 3/2007 | Holo | |
| 2009/0157242 A1 | 6/2009 | Holo et al. | |
| 2010/0091610 A1 | 4/2010 | Sollner | |
| 2013/0030709 A1 * | 1/2013 | Ferber ............. | 702/16 |

OTHER PUBLICATIONS

Eurasian Patent Search Report and Notification of a publishing date of Patent Search Report and Filing Request for Substantive Examination issued in patent application No. 201370093/26, mailed Mar. 18, 2014, 2 pages.
N. D. Whitmore, et al., "Imaging of primaries and multiples using a dual-sensor towed streamer," SEG Denver 2010 Annual Meeting, pp. 3187-3192. [Downloaded Apr. 14, 2011].
Shaoping Lu, et al., "Imaging of Primaries and Multiples with 3D Seam Synthetic," SEG San Antonio 2011 Annual Meeting, pp. 3217-3221. [Downloaded Feb. 6, 2012].
N. D. Whitmore, et al., "Imaging of Primaries and Multiples with Image Space Surface Related Multiple Elimination," G005, 73rd EAGE Conference & Exhibition incorporating SPE EUROPEC 2011, Vienna, Austria, May 23-26,2011, 5 pages.

* cited by examiner

*Primary Examiner* — Mark Hellner (57) ABSTRACT

Techniques are disclosed relating to determining or executing a survey pattern for a marine seismic survey vessel. The survey pattern may be determined based on a determined subsurface illumination area. The subsurface illumination area may be identifiable from primary reflections and higher-order reflections detected by sensors disposed in a sensor streamer configuration that may be towed behind the survey vessel. The sensor streamer configuration may include a plurality of streamers.

20 Claims, 9 Drawing Sheets

FIG. 7

SEISMIC SURVEYING TECHNIQUES WITH ILLUMINATION AREAS IDENTIFIABLE FROM PRIMARY AND HIGHER-ORDER REFLECTIONS

BACKGROUND

Marine seismic surveys may utilize energy, such as sound, that is transmitted to subsurface features and reflected back to sensors. The sensors may be configured as part of a number of streamers that may be towed behind a survey vessel. These streamers may be configured as a submerged array of multiple streamers, that may be arranged in parallel.

One common application of marine seismic surveying is oil and gas exploration in marine environments. For example, sound waves received during a marine seismic survey may be analyzed to locate hydrocarbon bearing geological structures, and thus determine the location of oil and natural gas deposits. To this end, survey paths may be calculated in order to provide optimal survey coverage of an area of interest. Such surveys paths may require a survey vessel to conduct numerous survey passes to adequately cover the area of interest.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Usable By." In the context of "element X is 'usable by' system Y to do Z," this phrase refers to a situation in which system Y is configured to perform function Z using (e.g., reading, manipulating, executing) element X. Thus, if a system is configured to determine a subsurface illumination area by performing various operations based on detected and gathered information, it can be said that the detected and gathered information is "usable by" the system to determine the subsurface illumination area.

"First," "Second," etc. As used herein, these terms are used as labels for nouns that they precede, and do not imply any type of ordering (e.g., spatial, temporal, logical, etc.) unless otherwise indicated.

"Based On." As used herein, this term is used to describe one or more factors that affect a determination. This term does not foreclose additional factors that may affect a determination. That is, a determination may be solely based on those factors or based only in part on those factors. Consider the phrase "determine A based on B." While B may be a factor that affects the determination of A, such a phrase does not foreclose the determination of A from also being based on C. In other instances, A may be determined based solely on B.

"Comprising." This is an open-ended term meaning "including the following elements (or their equivalents) but not excluding others." As used in the appended claims, this term does not foreclose additional structure or steps. Consider a claim that recites: "A system, comprising one or more sensor streamers . . . ." Such a claim does not foreclose the system from including additional components (e.g., a seismic source, data acquisition systems, navigations systems). "Including" and "having" are similarly used terms that are also open-ended.

"Configured To." As used herein, this term means that a particular piece of hardware or software is arranged to perform a particular task or tasks when operated. Thus, a system that is "configured to" perform task A means that the system may include hardware and/or software that, during operation of the system, performs or can be used to perform task A. (As such, a system can be "configured to" perform task A even if the system is not currently operating.)

\* \* \*

Figure 1:
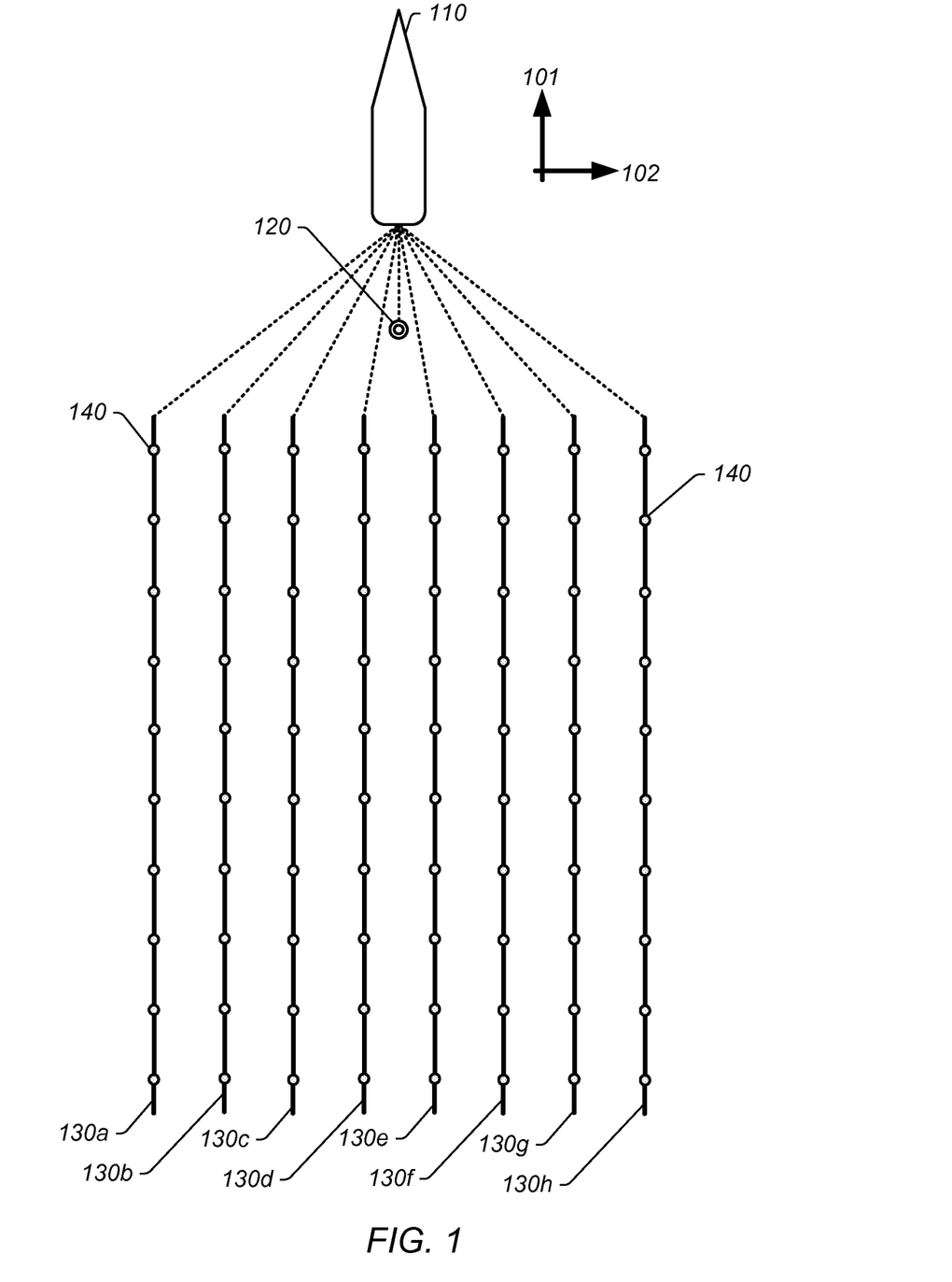
FIG. 1 depicts an example seismic survey vessel, suitable for executing techniques according to embodiments disclosed herein, towing sensor streamers and a seismic source in a body of water.

An exemplary configuration for seismic survey path planning and design is depicted in the plan view of FIG. 1. Survey vessel 110 may tow one or more sources 120 and a plurality of sensor streamers 130 in in-line direction 101. Alternatively, in some embodiments, source(s) 120 and streamers 130 may be towed by separate vessels or otherwise suitably disposed in the body of water. The various sensor streamers 130 may in some cases be arranged in a substantially parallel manner (spaced in cross-line direction 102) in order to provide imaging of a subsurface area. The imaging may be performed using received data corresponding to reflection/scattering of signals (e.g., pressure waves) generated by source 120. As depicted, the various sensor streamers 130 are arranged parallel to the in-line tow direction of survey vessel 110. In some embodiments, the various sensor streamers 130 may be arranged in a configuration that is offset from the towing direction of survey vessel 110 (e.g., aligned according to an angle that is offset from the towing direction), and/or in a configuration in which the various sensor streamers 130 are not substantially parallel to each other (e.g., aligned according to differing angles from the towing direction).

Each of the various sensor streamers 130 may include a number of sensors 140. Sensors 140 may include, for example, submerged pressure sensors (e.g., hydrophones)

and velocity sensors (e.g., geophones). Sensor streamer 130 may also include various additional components, such as steering devices.

Although FIG. 1 depicts a configuration using eight sensor streamers and one seismic source, embodiments of the present disclosure may employ configurations using more than one source, and/or differing numbers of sensor streamers. Furthermore, the number of sensors 140 depicted in FIG. 1 is for illustrative purposes, and various embodiments of the present disclosure may use a different number of sensors per streamer. In some embodiments, the various streamers may not all include the same number of streamers. In some embodiments, the sensors may be disposed in differing patterns, and/or may be irregularly spaced on the various streamers.

Figure 2A:
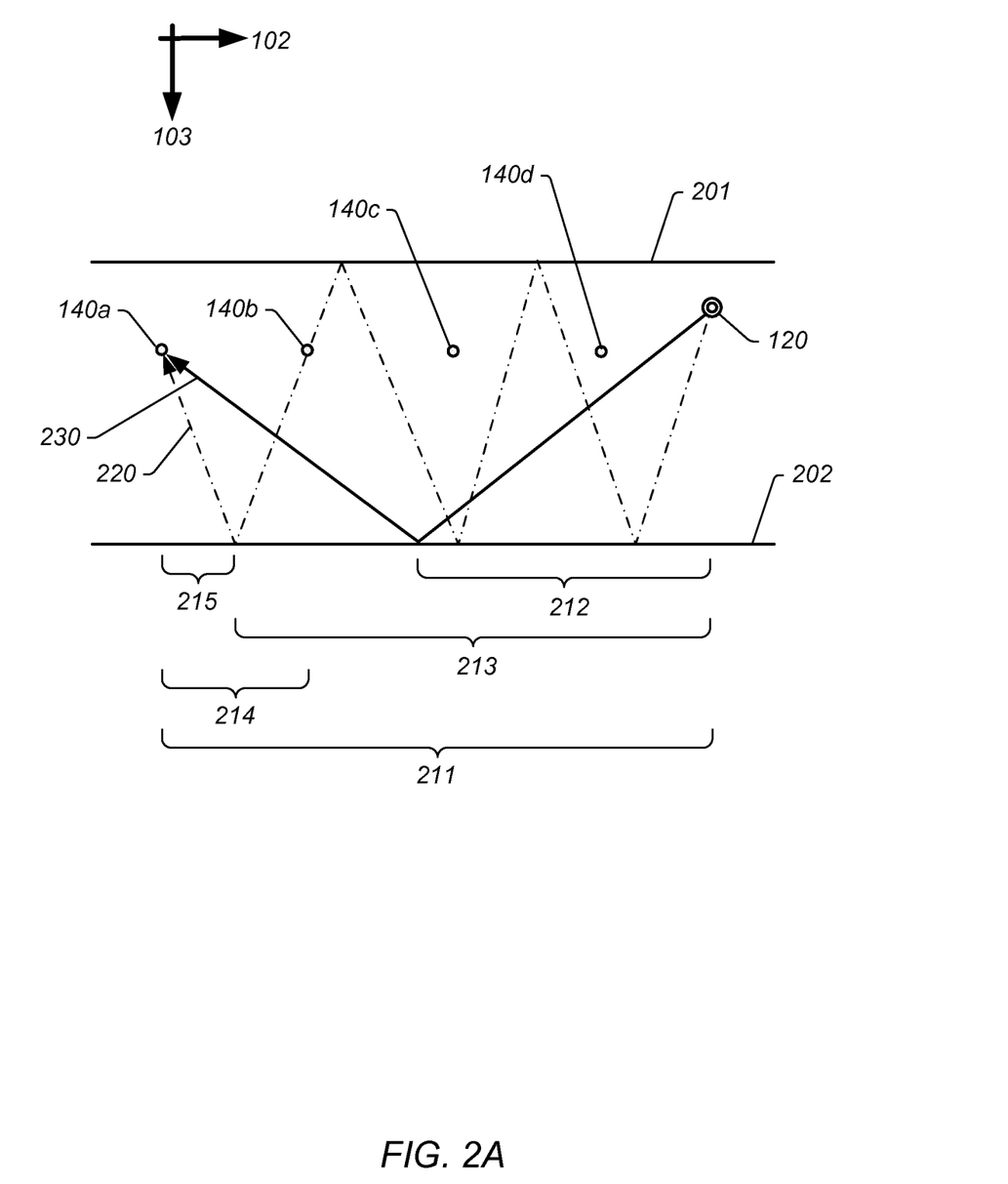
FIG. 2A depicts one example of primary and multiple reflections that may be received at a sensor and gathered for use in imaging in various embodiments.
Figure 2B:
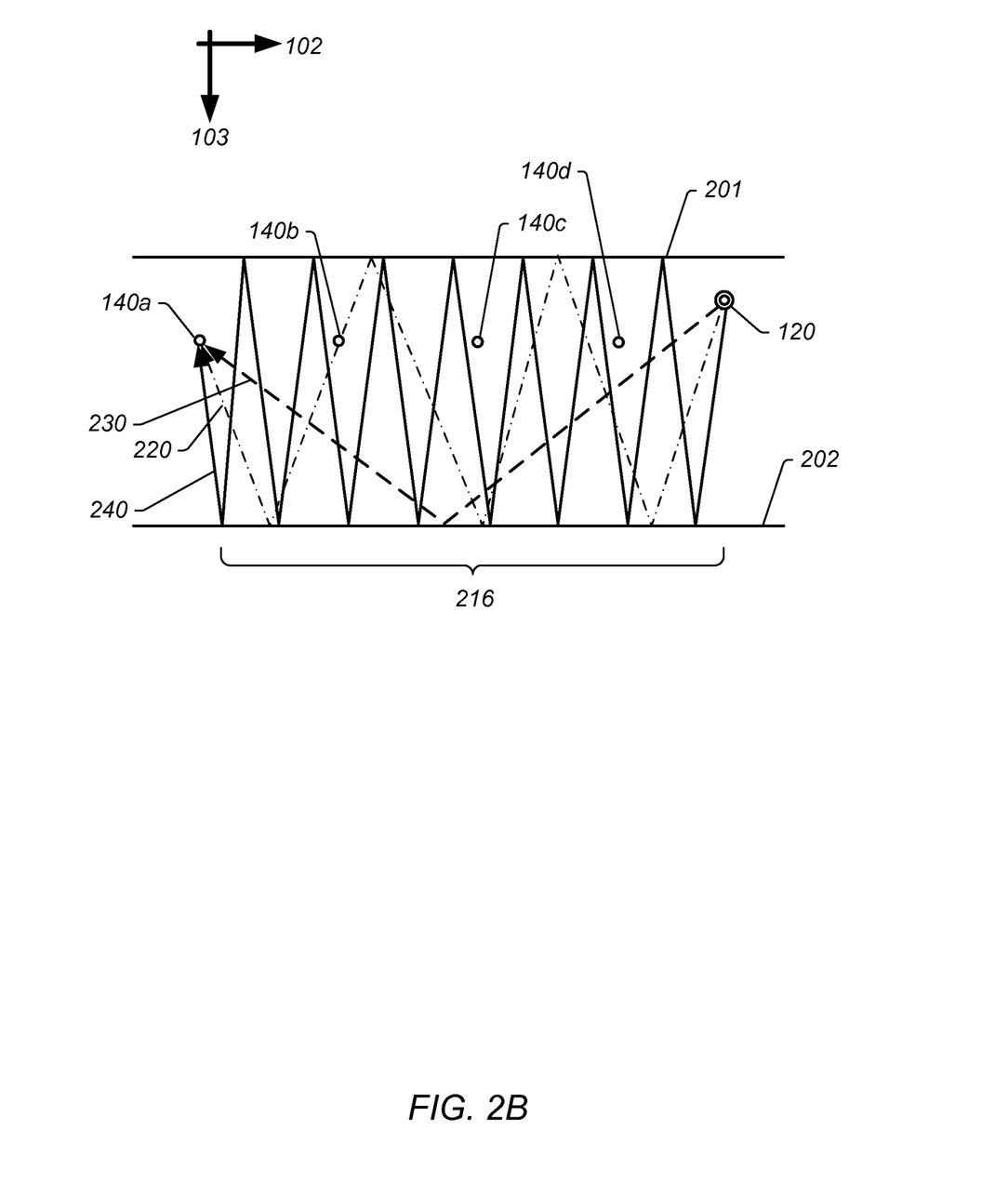
FIG. 2B illustrates the primary and multiple reflections depicted in the example of FIG. 2A, along with an additional higher-order multiple reflection.

Turning now to FIGS. 2A and 2B, views looking forward depict examples of primary and multiple reflections that may in some cases be used in imaging a subsurface illumination area. As shown in FIG. 2A, source 120 may cause primary reflections and various higher-order reflections to be received at sensors such as outermost sensor 140a. FIG. 2A depicts exemplary primary reflection 230, in which a waveform from source 120 is reflected once by reflector 202 (e.g., sea floor, subfloor features) before reaching sensor 140a. FIG. 2A also depicts exemplary higher-order reflection 220, in which a waveform is reflected multiple times before reaching 140 (in this example, the waveform in question is reflected three times by reflector 202 and twice by sea surface 201, for a total of five times. The term "higher-order reflections" thus refers to a waveform has been reflected at least twice between the source and the destination sensor.

Conventional seismic acquisition methods that employ imaging based only on primaries may define the subsurface illumination area by the midpoint spread (e.g., modeling subsurface structures as horizontally-layered media in survey planning). In such cases, the midpoint position may be a vector given by half of the sum of the receiver position vector and the source position vector. The cross-lines may be sequential numbers of the midpoints of a nominal source receiver configuration projected on the cross-line axis (the axis in the cross-line direction, perpendicular to the main sail line direction). The in-lines may be sequential numbers of the midpoints of a nominal source receiver configuration projected on the in-line axis (the axis in the in-line direction, parallel to the main sail line direction). The distance between consecutive in-lines and cross-lines may be given by the projection of the difference of consecutive midpoint vectors of a nominal source receiver configuration (e.g., a 3D streamer vessel) on the in-line axis and the cross-line axis, respectively. Thus, a primary reflected waveform 230 received at outermost sensor 140a may provide an outer-most boundary of an illumination area providing imaging of reflector 202 (e.g., sea floor, subsurface features) up to distance 212 (one-half of the distance 211 from source 120 to sensor 140a). Thus, marine seismic surveys patterns designed to correspond to these conventional methods may require sail line separations corresponding to half of the total streamer spread (e.g., the number of streamers times the streamer separation divided by two, the distance between the cross-lines of the outermost streamers) in order to provide full coverage of the area of interest. Similarly, the number (e.g., frequency) of shots that may be required to provide a desired in-line coverage may be determined based on the in-line dimensions of the illumination area.

In contrast to conventional marine seismic acquisition systems, dual (or multiple) sensor and dual (or multiple) streamer acquisition may allow separating upward-propagating wavefields from downward-propagating wavefields. The separated wavefields may provide for suppressing receiver ghost-related spectral notches, thereby resulting in high resolution images.

For certain parts of the spectral content of seismic signals (e.g., where motion sensors are noise contaminated), and under certain limiting sea surface conditions, the wavefield separation may be performed using only pressure sensors in conventional streamer acquisition. See U.S. Pat. Nos. 7,359, 283 and 7,835,225.

In contrast to conventional methods, techniques disclosed herein may be employed to determine navigation paths for marine seismic surveying based on subsurface illumination that results from imaging using separated wavefields (e.g., the complete upward-propagating and downward-propagating wavefields), including primary reflections and multiples. For example, Whitmore et al. describes imaging of primaries and multiples using dual-sensor data, dual-streamer wavefield separation, downward extrapolation, and the application of imaging conditions. See N. D. Whitmore, A. A. Valenciano, W. Söllner, S. Lu, *Imaging of primaries and multiples using a dual-sensor towed streamer,* 2010 Annual International Meeting, SEG, 3187-3192, incorporated herein by reference in its entirety. In contrast to imaging principles using only primaries (e.g., techniques that may filter data corresponding to multiples as noise), imaging using the complete separated wavefields (including primary reflections and higher-order reflections) may allow downgoing wavefields at each sensor location (e.g., downgoing portions of multiple reflection wavefield 220) to be regarded as a secondary source. Thus, the subsurface illumination area in both the cross-line direction and the in-line direction that may be imaged may be extended substantially. For example, FIG. 2A depicts a subsurface illumination area extending from the source to at least the middle between the two outermost streamers. More specifically, FIG. 2A illustrates an example of imaging using primaries and multiples to facilitate imaging of reflector 202 in the cross-line direction to distance 213, which is the distance from source 120 to the mid-point distance (distance 215) in the cross-line direction of the total distance between outermost sensor 140a (located at distance 211) and the next outermost sensor 140b (located at distance 214 in the cross-line direction from sensor 140a).

FIG. 2B depicts an example of an even greater subsurface illumination area that may be imaged in cases where higher-order multiples are utilized. The depicted subsurface illumination area, which is determined further based on higher-order multiple refection wavefield 240, extends a distance 216 that is almost the entire cross-line distance between source 120 and sensor 140a. As this principle is extended to very high-order multiples, the wavefield may in some cases behave like a downgoing plane wave (e.g., a source wavefield at the complete extent of the acquisition surface), and the resulting imaged area may in some cases cover the complete streamer spread. Generally, actual sea surfaces are not completely flat, but instead will typically represent some degree of roughness (e.g., dependent on the weather conditions). As a consequence, downward-propagating wavefields may generally be considered as omni-directional scattered wavefields at every receiver position. In various exemplary embodiments, the resulting imaged area may have a cross-line dimension that is at least 95% of the cross-line distance between the two outermost streamers.

In seismic data obtained using embodiments of marine acquisition configurations that may employ dual sensors and one or more active sources, and that may use imaging technology that is based on the principle of imaging with separated wavefields, the complete downward-propagating wavefield may act as "simultaneous sources" at every receiver position. Conventional seismic surveys using active sources at every receiver position (e.g., symmetric sampling) provide favorable configurations with respect to faithful wavefield reconstruction. Embodiments of the present disclosure may achieve "simultaneous symmetric sampling" (e.g., without the use of active sources at every receiver position) by combining dual sensor acquisition with the principle of imaging with separated wavefields.

Figure 3:
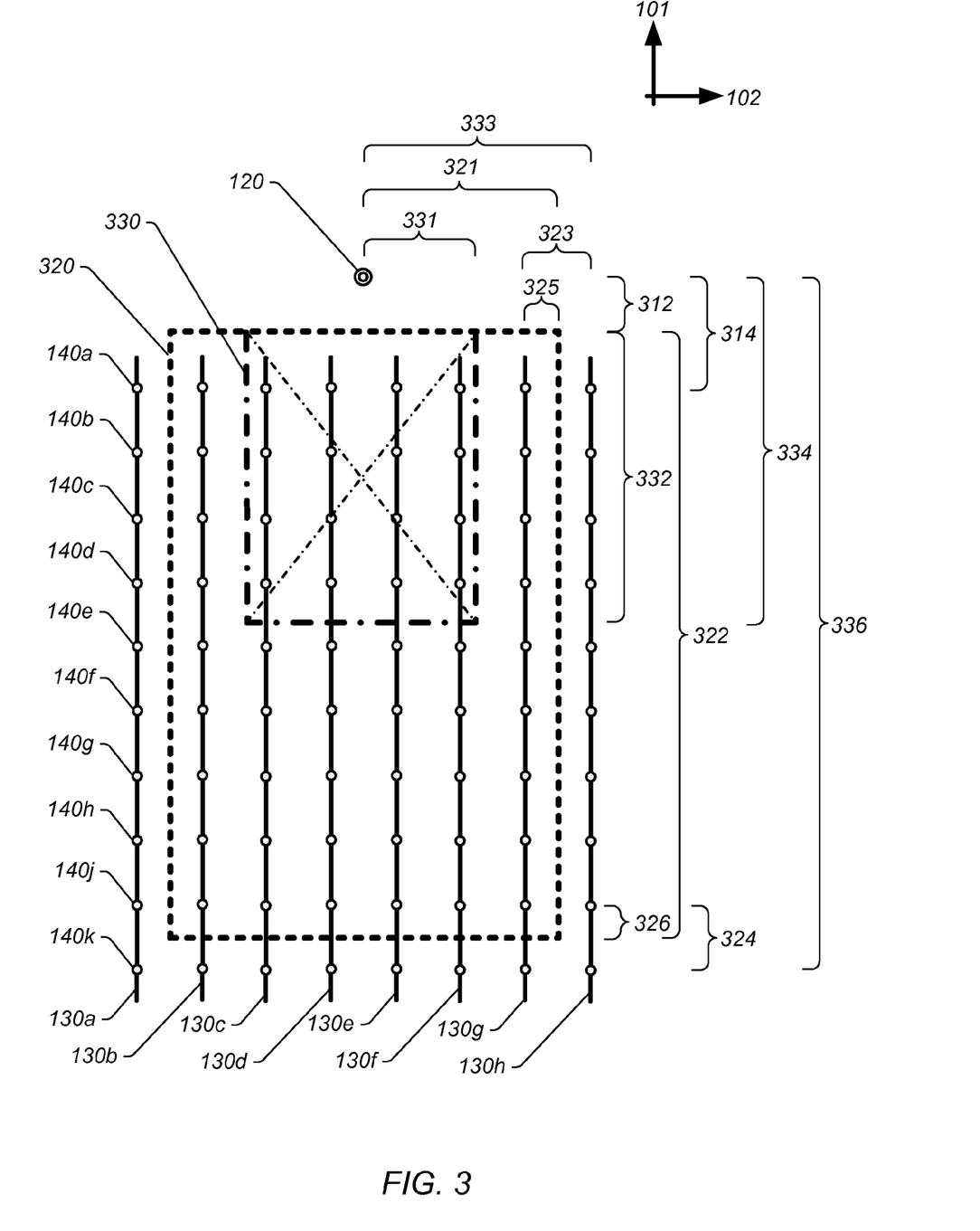
FIG. 3 depicts a surface illumination area based on imaging using primary and multiple reflections in accordance with some embodiments.

These techniques also apply to the subsurface illumination area in the in-line direction, as discussed in more detail with regard to FIG. 3. Accordingly, the present techniques may be used to determine seismic survey navigation paths based on larger subsurface illumination areas by taking primaries and multiples into account, thereby reducing the acquisition effort by reducing the number of passes that a survey vessel must complete to image an area of interest.

Furthermore, this use of multiples may also provide increased fold (e.g., increased received seismic data representative of the area of illumination) in the cross-line and/or the in-line directions. For example, higher-order multiple refection wavefield 240 that is depicted in FIG. 2B may provide greatly increased seismic data (per shot from source 120) that may be received by various sensors 140. Accordingly, the present techniques may achieve a desired subsurface fold using less active shots than that which is used in conventional methods of imaging based only on primaries.

FIG. 3 provides a plan view illustrating one example of the greater subsurface illumination area that may be determined using embodiments of the present techniques, and the improved navigation path (e.g., based on larger-spaced sail lines) that may be determined. In this example, subsurface illumination area 330 represents an illumination area that may be achieved via conventional techniques of imaging using only primaries. The cross-line dimension of the subsurface illumination area 330 extends in the cross-line direction 102 for distance 331 from source 120. As discussed above, distance 331 is one-half of the distance to the outermost streamer 130h (one-half of distance 333). Thus, the overall cross-line direction of subsurface illumination area 330 may be expressed as one-half the cross-line distance between the two outermost streamers 130a and 130h.

Similarly, the in-line dimension of the subsurface illumination area that may be achieved via conventional techniques of imaging using only primaries is distance 332 in the example of FIG. 3. This distance is the distance between the mid-point 312 in the in-line direction of the distance between the source and the forward-most sensors (distance 314), and the mid-point 334 in the in-line direction of the distance between the source and the aft-most sensors (distance 336).

In contrast, one example of the improved illumination area provided by the present techniques is depicted in this example as subsurface illumination area 320. The depicted cross-line dimension of the subsurface illumination area 320 (which is greater than the above-described cross-line dimension of area 330) extends in the cross-line direction 102 for distance 321 from source 120. As discussed above, distance 321 is the cross-line distance from source 120 to the mid-point 325 in the cross-line direction of the distance 323 between the outermost streamer 130h and the next-outermost streamer 130g. Thus, the overall cross-line direction of subsurface illumination area 320 may be expressed as the sum of the cross-line distance between the port-side next-outermost streamer and the starboard-side next outermost streamer (streamers 130b and 130g), one-half of the cross-line distance between the port next-outermost streamer 130b and the port outer-most streamer 130a, and one-half of the cross-line distance between the starboard next-outermost streamer 130g and the starboard outer-most streamer 130h.

As discussed above, in other examples the subsurface illumination area may approach, or equal, the distance between the two outermost streamers (e.g., port outer-most streamer 130a and starboard outer-most streamer 130h). In some examples, the subsurface illumination area may be greater than or equal to 95% of the distance between the two outermost streamers Embodiments of the present techniques may be used to provide a similarly improved subsurface illumination area in the in-line direction. For example, the in-line dimension of subsurface illumination area 320 of FIG. 3 (which is greater than the above-described cross-line dimension of area 330) is the distance between 1) the mid-point 312 in the in-line direction of the distance between the source and the fore-most sensors (distance 314), and 2) the mid-point 326 in the in-line direction of the distance 324 between the next aft-most sensors (e.g., 140k) and the aft-most sensors (e.g., 140j).

Figure 4:
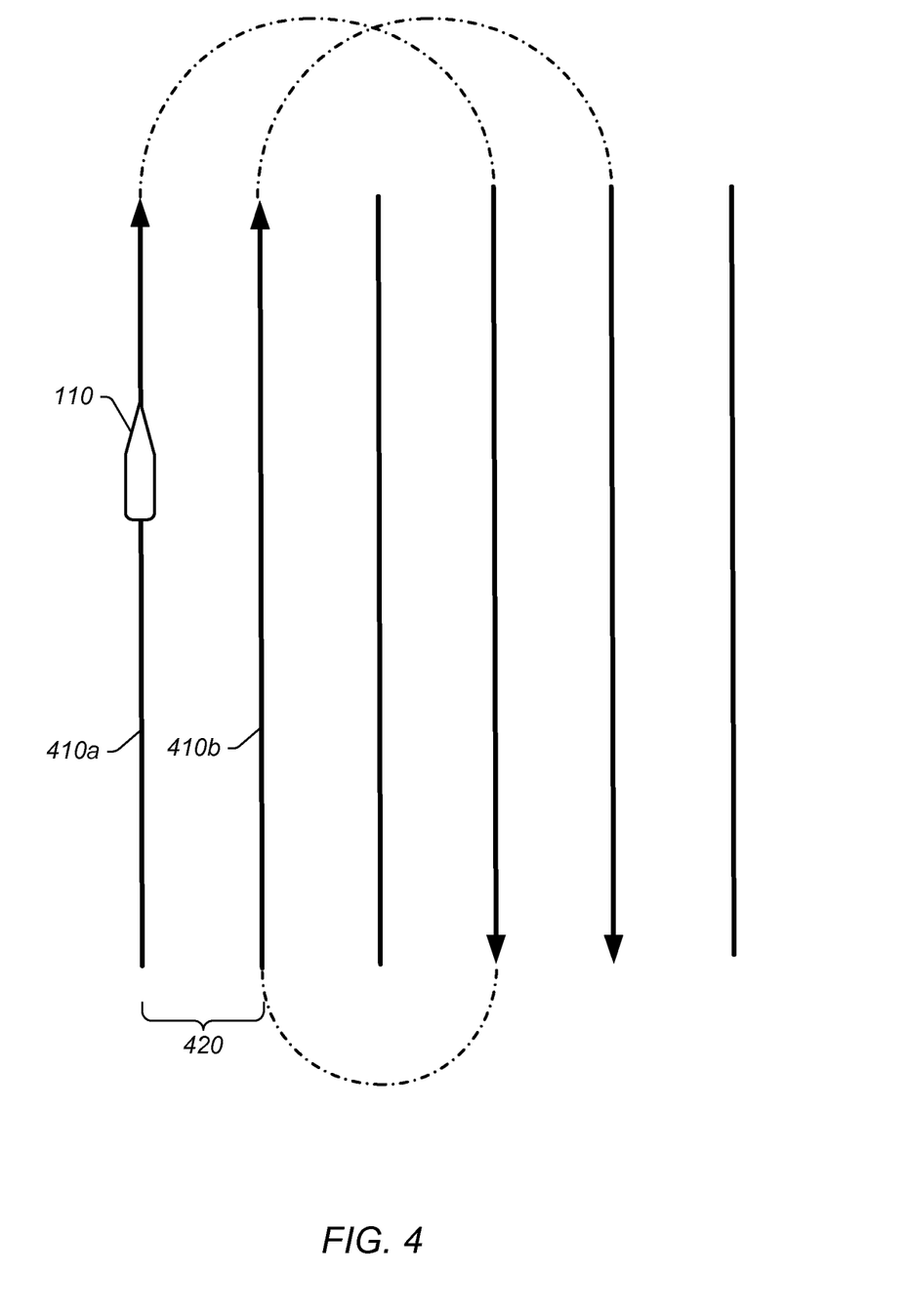
FIG. 4 depicts an example survey path that may be determined using techniques in accordance with some embodiments.

In various embodiments, an improved surface illumination area permits a vessel to perform a survey pattern that includes fewer passes over a given area. Referring to FIG. 4 for example, a vessel 110 implementing the techniques described herein may have a survey pattern that includes survey paths 410a and 410b having a spacing 420. In this instance, the spacing 420 between paths 410 may be significantly greater than the spacing between paths performed by a vessel using traditional surveying techniques. Still further, in some embodiments, vessel 110 performs a survey pattern that includes a shot sampling plan than is not as dense as prior plans due to the size of the improved surface illumination area. That is, vessel 110 may perform fewer shots spaced further apart to achieve a desired subsurface coverage.

Figure 5:
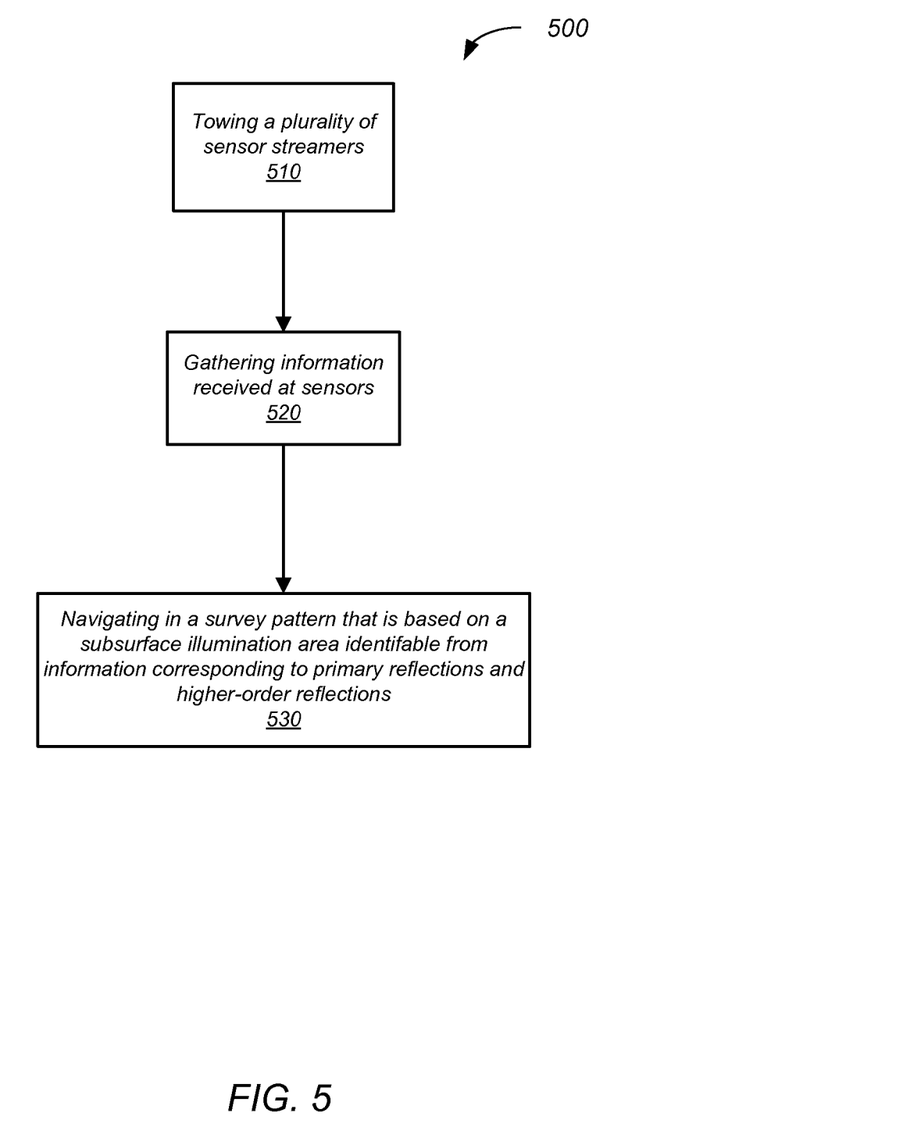
FIG. 5 is a flow diagram illustrating a method for navigating a survey vessel in accordance with one embodiment.

Turning now to FIG. 5, a flow diagram of one embodiment of a method for navigating a survey vessel in a survey path is shown. Method 500 includes towing a plurality of sensor streamers (e.g., in an in-line direction behind a survey vessel 110). Method 500 further includes gathering information received at sensors disposed along the plurality of sensor streamers 520. The gathered information includes data corresponding to primary reflections and data corresponding to higher-order reflections. At 530, the method includes navigating the survey vessel in a survey pattern. This navigating may be based on a subsurface illumination area identifiable from information corresponding to the primary reflections and information corresponding to the higher-order reflections. In some embodiments, the navigating includes implementing a shot sampling plan based on the size of the subsurface illumination area. Accordingly, in one embodiment, survey vessel may adjust the shot sampling plan by decreasing or increasing the rate at which shots are performed (i.e., the shot density) after or in response to a change in the subsurface illumination area (i.e., an increase or decrease in the current size of the area). In one embodiment, this adjustment may be performed automatically by a data acquisition system of the survey vessel such as data acquisition system 710 discussed below with respect to FIG. 7.

The plurality of sensor streamers may include a first outermost streamer, a second outermost streamer, and two or more sensor streamers disposed between the first and second outermost streamers. The two or more sensor streamers disposed between the first and second outermost streamers include a third streamer that is closest to the first outermost streamer, and a fourth streamer that is closest to the nearest of the plurality of sensor streamers to the second outermost streamer. In FIG. 3, for example, the first and second outermost streamers may be streamers 130a and 130h, respectively. The third and fourth streamers that are closest to the first and second outermost streamers are streamers 130b and 130g, respectively (these streamers are adjacent to streamers 130a and 130h.) In some cases, the navigating is based on a subsurface illumination area that comprises a dimension (e.g., a width) in a cross-line direction that is at least the sum of the cross-line distance between the third streamer and the fourth streamer, one-half the cross-line distance between the first outermost streamer and the third streamer, and one-half the cross-line distance between the second outermost streamer and the fourth streamer.

Some embodiments may include a single seismic energy source. In other embodiments, multiple sources may be used.

Figure 6A:
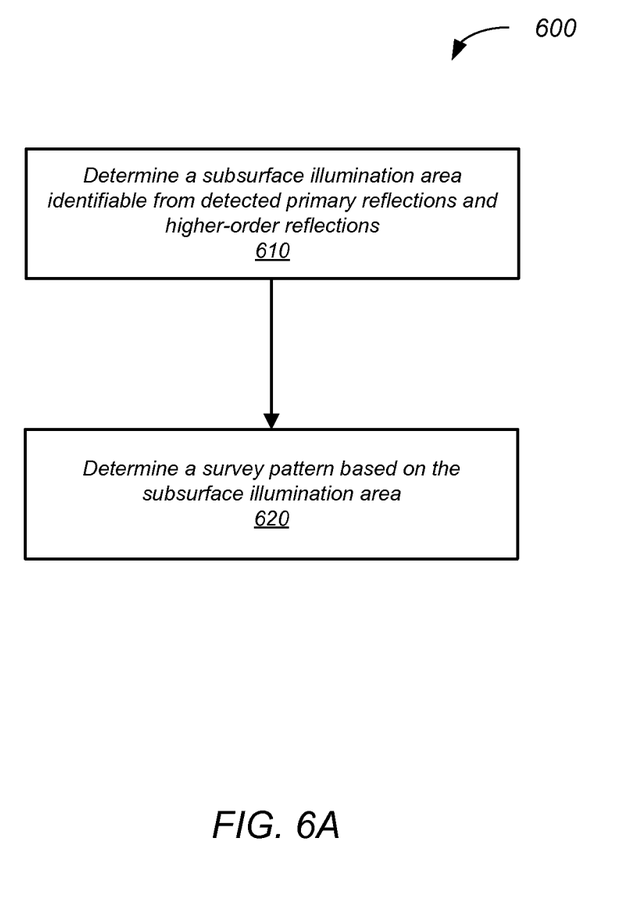
FIG. 6A is a flow diagram illustrating a method for determining a survey pattern with a subsurface illumination area that is based on imaging using primary reflections and multiple reflections.

FIG. 6A presents a flow diagram of a method 600 for determining a survey pattern. At 610, the method includes determining a subsurface illumination area identifiable from detected primary reflections and higher-order reflections. These primary and higher-order reflections may be detected by sensors disposed in a streamer configuration that includes a plurality of towed sensor streamers. In some embodiments, a data acquisition system of the survey vessel (e.g., data acquisition system 710 described below with respect to FIG. 7) determines the subsurface illumination area by tracking locations of the sensor streamers. For example, in one embodiment, the data acquisition system may track multiple coordinate positions (e.g., relative to in-line and cross-line axes) along a given streamer, where positions may correspond to ones of the sensors in the streamer (e.g., the forward-most sensor, aft-most sensor, and one or more intermediary sensors). In some embodiments, the data acquisition system determines (e.g., in real time) an instant subsurface illumination area based on the locations. In one embodiment, this area may be determined by determining an instant dimension in an in-line direction and an instant dimension in a cross-line direction for the sensor streamers based on various criteria discussed above. At 620, the method includes determining a survey pattern based on the subsurface illumination area. In some embodiments, determining the survey pattern includes selecting a heading for the survey vessel (e.g., a bearing corresponding a path 410) based on the instant subsurface illumination area and providing the selected heading to a navigation system of the survey vessel (e.g., navigation system 720 discussed below with respect to FIG. 7). In such an embodiment, the navigation system may be configured to adjust a current heading of the survey vessel to be the selected heading. For example, a survey vessel may encounter a cross current that initially causes a portion of the starboard sensor streamers to move leeward—thus reducing the subsurface illumination area. In response to detecting this reduction of area, in one embodiment, the survey vessel may change its heading to account for potential blind spots caused by this reduction. (In some embodiments, the survey pattern determined in 620 may be determined as a function of the data acquisition system, a function of the navigation system, or a function of some other system of the survey vessel.)

Figure 6B:
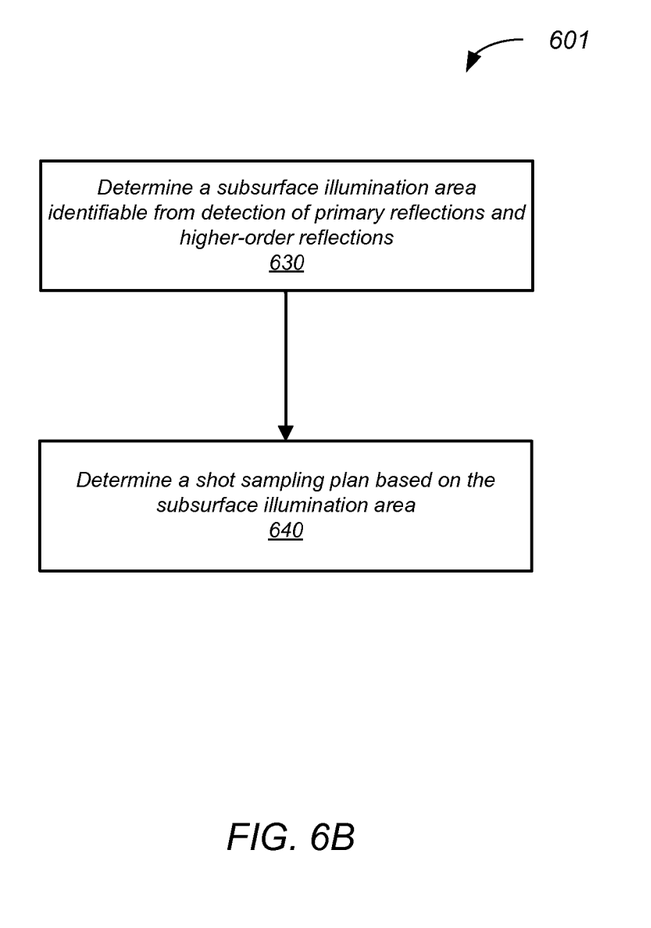
FIG. 6B is a flow diagram illustrating a method for determining a survey pattern that includes a shot sampling plan for use with a subsurface illumination area that is based on imaging using primary reflections and higher-order reflections.

FIG. 6B presents a flow diagram of method 601 for determining a survey pattern. At 630, the method includes determining a subsurface illumination area identifiable from detection of primary reflections and higher-order reflections. These primary and higher-order reflections may be detected by sensors disposed in a streamer configuration that includes a plurality of towed sensor streamers. At 640, the method includes determining a shot sampling plan based on the subsurface illumination area (e.g., based on a determined in-line dimension of the subsurface illumination area).

As an exemplary application of "simultaneous symmetric sampling," a marine survey pattern using dual sensors and the principle of separated wavefield imaging may close the illumination gaps caused by streamer feathering or navigation around obstacles (as for example platforms or other fixed installation) to a minimum. In conventional streamer acquisition methods, such gaps are typically filled by expensive infill and undershooting acquisition procedures.

Figure 7:
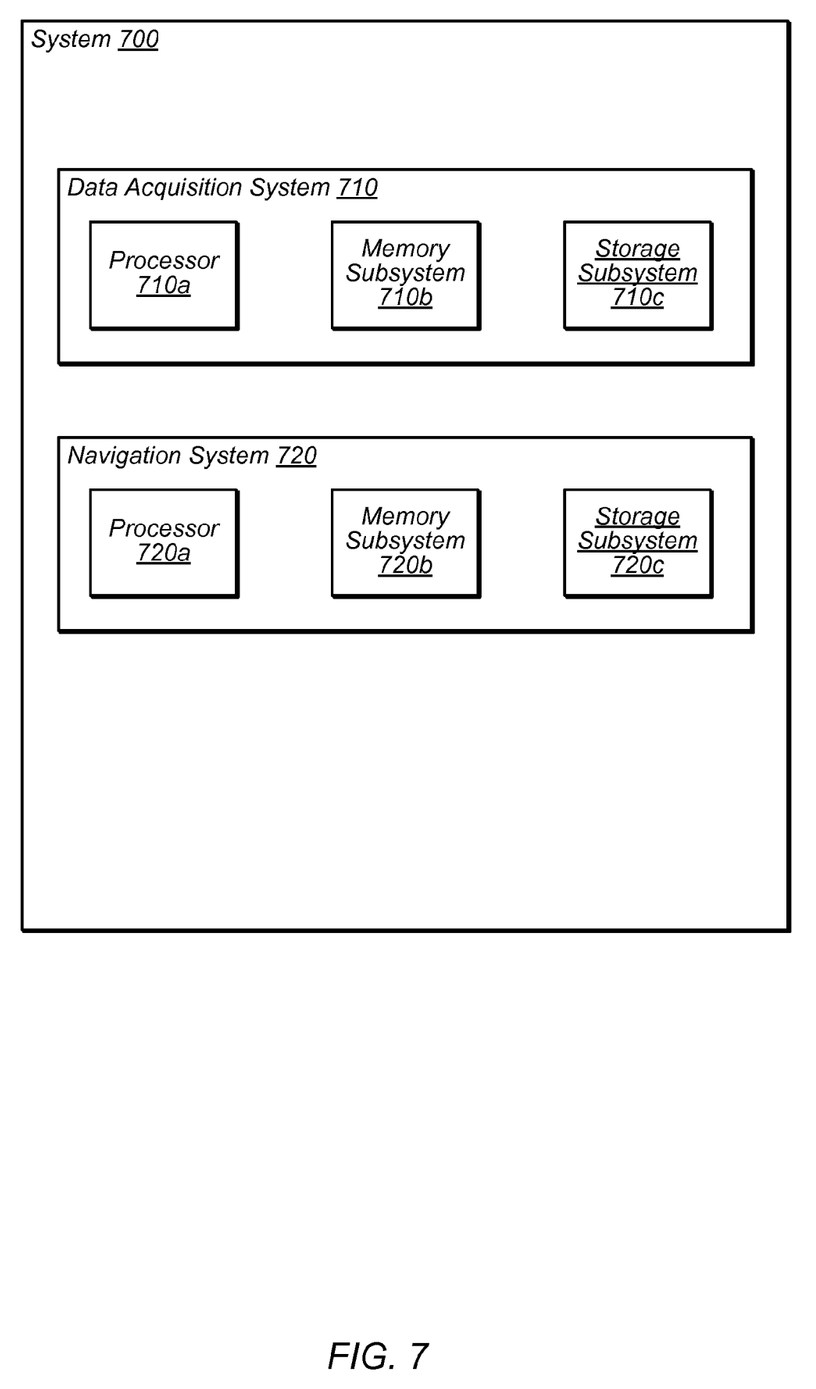
FIG. 7 is a block diagram of one embodiment of a system that includes a data acquisition system and a navigation system, according to various embodiments of the present disclosure.

FIG. 7 depicts an example of an embodiment that may be used to practice the above-described methods. System 700 may include data acquisition system 710 and navigation system 720. In some embodiments, data acquisition system 710 and navigation system 720 may be integrated as part of one system. In other embodiments, the respective systems may be discreet systems.

As shown, data acquisition system 710 may include processor 710a, memory subsystem 710b, and storage subsystem 710c. Processor 710a (which may be multiple individual processors) may contain a cache or other form of on-board memory.

Memory 710b may include one or more memory subsystem components. For example, in various embodiments memory 710b may be implemented using one or more subsystems that may individually include flash memory, random access memory (RAM, SRAM, EDO RAM, SDRAM, DDR SDRAM, RDRAM, etc.), ROM (PROM, EEPROM, etc.), and/or various other forms of volatile or non-volatile memory. Memory 710b may store program instructions executable by data acquisition system 710 using processors 710a, including program instruction executable to cause system 700 to implement the various techniques disclosed herein.

Storage 710c may include one or one or more storage subsystem components. For example, in various embodiments storage 710c may be implemented using one or more subsystems having any type of physical storage technology, including hard disk storage (e.g., magnetic or solid state), floppy disk storage, optical disk storage, tape storage, and so on. Some embodiments of data acquisition system 710 may not include storage 710c that is separate from memory 710b (e.g., systems having only volatile memory, systems having non-volatile memory implemented in flash memory only). In some embodiments, all or part of storage 710c may be remote from the other components of data acquisition system 710. Storage 710c may store program instructions executable by computer system 100 using processors 710a, including program instruction executable to cause data acquisition system 710 using processors 710a, including program instruction executable to cause system 700 to implement the various techniques disclosed herein.

As shown, navigation system 720 may include processor 720a, memory subsystem 720b, and storage subsystem 720c. These elements are similar to processor 710a, memory subsystem 710b, and storage subsystem 710c described above in the context of data acquisition system 710. Accordingly, the description of these elements with data acquisition system 710 applies equally to these elements in the context of navigation system 720.

\* \* \*

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method, comprising:
towing a plurality of sensor streamers behind a survey vessel;
gathering, based on data received at sensors along the plurality of sensor streamers, information corresponding to primary reflections and information corresponding to higher-order reflections;
navigating the survey vessel in a survey pattern, wherein said navigating is based on a subsurface illumination area identifiable from the information corresponding to primary reflections and the information corresponding to higher-order reflections.

2. The method of claim 1,
wherein said towing includes towing the plurality of sensor streamers in an in-line direction and in a non-linear path; and
wherein said gathering includes separating upward-propagating wavefields from downward-propagating wavefields.

3. The method of claim 1,
wherein the primary reflections and the higher-order reflections are produced using a single energy source towed by the survey vessel; and
wherein the subsurface illumination area has a dimension in a cross-line direction that is greater than one-half of the cross-line distance from a first outermost streamer to a second outermost streamer, and wherein the plurality of sensor streamers are towed in an in-line direction normal to the cross-line direction.

4. The method of claim 1,
wherein the plurality of sensor streamers include a first outermost streamer, a second outermost streamer, a third streamer adjacent to the first outermost streamer, and a fourth streamer adjacent to the second outermost streamer; and
wherein the subsurface illumination area has a dimension in a cross-line direction, wherein the dimension is at least the sum of 1) the cross-line distance between the third streamer and the fourth streamer, 2) one-half the cross-line distance between the first outermost streamer and the third streamer, and 3) and one-half the cross-line distance between the second outermost streamer and the fourth streamer.

5. The method of claim 4,
wherein the primary reflections and higher-order reflections are produced using a single energy source.

6. The method of claim 1,
wherein the subsurface illumination area has a dimension in a cross-line direction that is at least 95% of the cross-line distance from a first outermost streamer to a second outermost streamer.

7. The method of claim 1,
wherein said navigating includes implementing a shot sampling plan based on a size of the subsurface illumination area, wherein the subsurface illumination area has a dimension in an in-line direction that is greater than the in-line distance between:
a first position located at a midpoint between an energy source and a forward-most position of sensors along the plurality of sensor streamers; and
a second position located at a midpoint between the energy source and an aft-most position of sensors along the plurality of sensor streamers.

8. The method of claim 1,
wherein said navigating includes implementing a shot sampling plan based on a size of the subsurface illumination area, wherein the subsurface illumination area has a dimension in an in-line direction that is greater than the in-line distance between:
a first position located at a midpoint between an energy source and a forward-most position of sensors along the plurality of sensor streamers; and
a second position located at a midpoint between an aft-most position and a next aft-most position of sensors along the plurality of sensor streamers.

9. A method, comprising:
determining a subsurface illumination area identifiable from primary reflections and higher-order reflections detected by sensors along a plurality of sensor streamers being towed by a survey vessel; and
determining a survey pattern for the survey vessel based on the determined subsurface illumination area.

10. The method of claim 9,
wherein detecting the primary reflections and higher-order reflections includes the survey vessel identifying upward-propagating wavefields and downward-propagating wavefields; and
wherein said determining the subsurface illumination area includes determining a dimension in a cross-line direction, wherein the dimension is greater than one-half of the cross-line distance from the first outermost streamer to the second outermost streamer.

11. The method of claim 9,
wherein said determining the subsurface illumination area includes:
a data acquisition system of the survey vessel tracking locations of the plurality of sensor streamers; and
the data acquisition system determining an instant subsurface illumination area based on the locations.

12. The method of claim 11,
wherein said determining the survey pattern includes:
selecting a heading for the survey vessel based on the instant subsurface illumination area; and
providing the selected heading to a navigation system of the survey vessel, wherein the navigation system is configured to adjust a current heading of the survey vessel to be the selected heading.

13. The method of claim 9,
wherein said determining the subsurface illumination area includes determining a dimension in a cross-line direction that is at least 95% of the cross-line distance from a first outermost streamer to a second outermost streamer.

14. The method of claim 9, further comprising:
  determining a survey shot plan based on the subsurface illumination area; and
  adjusting the survey shot plan responsive to a change in the subsurface illumination area.

15. The method of claim 9, further comprising:
  determining a survey shot plan based the subsurface illumination area, wherein the subsurface illumination area has a dimension in an in-line direction, wherein the dimension is greater than the in-line distance between:
    a first position located at a midpoint between an energy source and a forward-most position of sensors along the plurality of sensor streamers; and
    a second position located at a midpoint between an aft-most position and a next aft-most position of sensors along the plurality of sensor streamers.

16. A system, comprising:
  a data acquisition system configured to gather information detected at sensors along a plurality of sensor streamers that are towed behind a survey vessel, wherein the gathered information includes data corresponding to primary reflections and data corresponding to higher-order reflections;
  a navigation system configured to navigate the survey vessel in a survey pattern, wherein the survey pattern is based on a subsurface illumination area identifiable from the data corresponding to the primary reflections and the data corresponding to the higher-order reflections.

17. The system of claim 16, further comprising:
  the plurality of sensor streamers, wherein the plurality of sensor streamers includes: a first outermost streamer, a second outermost streamer, and two or more streamers disposed between the first and second outermost streamers;
  a single energy source towed behind the marine survey vessel, wherein the single energy source is configured to produce waveforms corresponding to the primary reflections and the higher-order reflections; and
  wherein the subsurface illumination area has a dimension in a cross-line direction that is greater than one-half of the cross-line distance from the first outermost streamer to the second outermost streamer.

18. The system of claim 16, further comprising:
  the plurality of sensor streamers, wherein the plurality of sensor streamers includes:
    a first outermost streamer;
    a second outermost streamer;
    a third streamer adjacent to the first outermost streamers; and
    a fourth streamer adjacent to the second outermost streamers; and
  wherein the subsurface illumination area has a dimension in a cross-line direction that is at least the sum of:
    the cross-line distance between the third streamer and the fourth streamer;
    one-half the cross-line distance between the first outermost streamer and the third streamer; and
    one-half the cross-line distance between the second outermost streamer and the fourth streamer.

19. The system of claim 16, wherein the subsurface illumination area has a dimension in a cross-line direction that is at least 95% of the cross-line distance from a first outermost streamer to a second outermost streamer.

20. The system of claim 16, wherein the subsurface illumination area has a dimension in an in-line direction that is greater than the in-line distance between:
  a first position located at a midpoint between an energy source and a forward-most position of sensors along the plurality of sensor streamers; and
  a second position located at a midpoint between the energy source and an aft-most position of sensors along the plurality of sensor streamers.

* * * * *